July 29, 1952 A. G. SEIFRIED Re. 23,530
ELECTRIC SWITCH
Original Filed Feb. 7, 1944
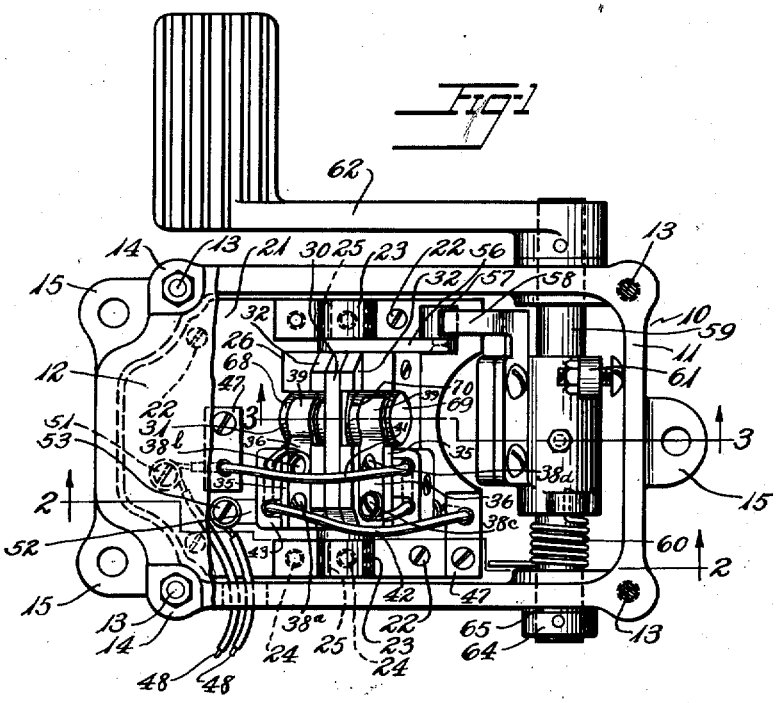
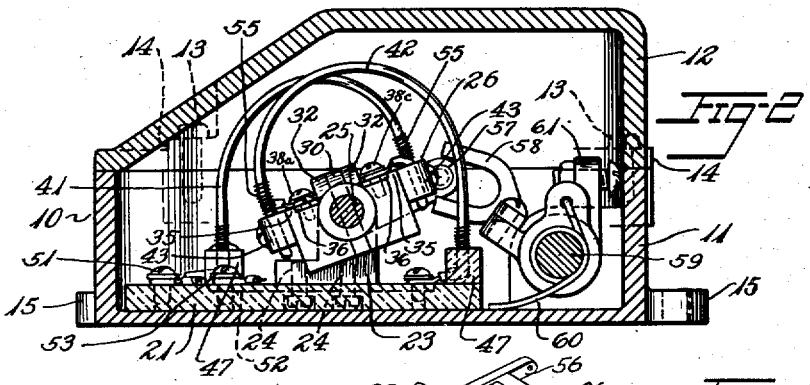
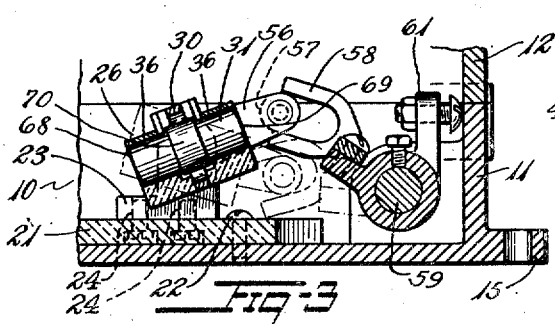
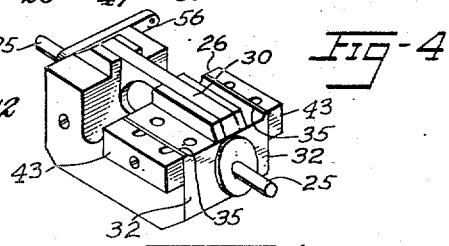
Inventor
Anthony G. Seifried
By Willis J. Avery
Atty.

Reissued July 29, 1952

Re. 23,530

UNITED STATES PATENT OFFICE 23,530

ELECTRIC SWITCH

Anthony G. Seifried, Akron, Ohio, assignor to The B. F. Goodrich Company, New York, N. Y., a corporation of New York Original No. 2,433,163, dated December 23, 1947, Serial No. 521,305, February 7, 1944. Application for reissue August 3, 1949, Serial No. 108,339

15 Claims. (Cl. 200—152)

Matter enclosed in heavy brackets [ ] appears in the original patent but forms no part of this reissue specification; matter printed in italics indicates the additions made by reissue.

The invention relates to electric circuit breaking switches and especially to switches suitable for use in the presence of inflammable materials such, for example, as gasoline and benzine.

For protective purposes electric circuit breaking switches may be enclosed in protective casings or housings and provided with external operating handles for operating the mechanical switching means for making and breaking the circuit. Because of difficulty in sealing such casings and because of arcing at the exposed make-and-break contacts of the switching mechanisms, the enclosed switches of prior constructions have not been wholly satisfactory for reliable and extended operation in a cyclical manner, especially in explosive atmospheres where safety is of paramount importance.

Principal objects of the invention are to provide for effectively making and breaking the electric circuit in a non-arcing manner; to provide for reliability and safety of operation of electric switches, especially in the presence of inflammable materials; to provide for relative rapidity of cyclical operation of such switches; and to provide simplicity and compactness of construction, convenience of manufacture and servicing, and effectiveness of operation.

Other objects of the invention are to provide a switch having fluid-contact means arranged for operation by correlated quick-make and quick-break means; to provide an improved switch, especially a switch in which the contacts cannot be stuck or frozen together as is possible in the knife blade type of switch; and to provide for removing the switch as an integral unit from the enclosing casing.

These and other objects and advantages will be apparent from the following description.

In the accompanying drawings which form a part of this specification and in which like numerals are employed to designate like parts throughout the same, Fig. 1 is a plan view from above of an electric switch mounted in a protective casing and constructed in accordance with and embodying the invention, parts being broken away, Fig. 2 is a sectional view in elevation taken along line 2—2 of Fig. 1, and Fig. 3 is a view like Fig. 2 taken along line 3—3 of Fig. 1, parts being broken away, Fig. 4 is a perspective view of the rocking platform unit.

In the embodiment of the invention illustrated in the drawings, a casing or housing 10 protects the electric switching means mounted therein against inflammable materials and against objectionable dust or other foreign material deposits. The housing 10 may be of cast or sheet metal or other suitable stiff material construction having a lower part 11 and an upper part 12 which parts 11 and 12, when in assembled relation, may be held detachably together in substantially sealing contact along their abutting flanged margins by a plurality of screw fasteners 13, 13 extending through apertures in bosses 14, 14 of the flanged margin of the upper part and engaging the threaded walls of registering apertures in like bosses of the flanged margin of the lower part. The lower part 11 may also be provided with attaching lugs 15, 15 for facilitating mounting the housing on a surface such, for example, as a floor by suitable fasteners (not shown) extending through apertures in such lugs.

The electric switching means within the housing 10 includes a base member 21 of suitable electrical insulating material such, for example, as phenol-aldehyde plastic material detachably secured to the bottom wall of the lower part 11 as by screw fasteners 22, 22. Spaced-apart pedestals 23, 23 are positioned at the sides and intermediate the ends of the base member and may be attached thereto as by spaced-apart screw fasteners 24, 24, the pedestals may include lubricant-impregnated bearing sleeves within aligned apertures for receiving trunnions 25, 25 of a rocking platform or oscillating structure 26 extending between the pedestals transversely of the base member.

The rocking platform 26 comprises a central web or elongated plate element 30 including the integral trunnions 25, 25 of relatively strong stiff material such, for example, as steel, the plate element having an aperture therethrough intermediate its ends for receiving and supporting a closed container 31, desirably of cylindrical form. Elongated supporting elements 32, 32 of suitable electrical insulating plastic material and of substantially like form as that of the plate element are mounted at opposite sides of the plate element as by screw fasteners and may extend substantially along the extent of such plate element.

The supporting elements 32, 32 have rounded grooves at the upper parts thereof in register with the aperture in the plate element 30 for accommodating and further supporting the closed container 31 *by providing a seat therefor below the axis of the trunnions 25, 25. The arrangement, as will be seen in Figs. 1 to 4 and especially in Fig. 3, is such that the container or cartridge 31 is intersected by the axis of oscillation of the platform 26, and by virtue of this intersection, the cartridge is quickly tilted under the oscillation of the platform about its axis without movement in translation of the cartridge as a whole, so that maximum speed is effected in the action of the cartridge to make and break the circuit.*

The upper part of each supporting element may also have a depressed shelf-like portion 35 spaced from the plate element 30 in which shelf-like portion 35 may be provided a channel for receiving a conductor element 36 of electrically conductive metal material such, for example, as resilient brass strip material. The conductor elements 36, 36 are detachably secured in such channels as by spaced-apart screw fasteners 38a, 38b, 38c and 38d and include end portions 39 overlying the grooves in the supporting elements 32, which end portions are adapted to press in a springing manner against the closed container 31 thereby retaining detachably the container on the rocking platform 26 despite the rocking movement of the latter.

For conducting the current from the conductor elements 36, 36, spaced-apart flexible conductors 41 and 42 extend between and are mounted on the base member 21 and the rocking platform 26 with open-looped reaches of the flexible conductors therebetween, as shown especially in Fig. 2, for accommodating the rocking movement of such platform. At the rocking platform, the flexible conductors 41 and 42 may be connected to the conductor elements 36 by the screw fasteners 38b and 38c, respectively. For positioning and assisting in relieving flexing strains on the flexible conductors adjacent the rocking platform, positioning elements 43 of suitable electrical insulating plastic material having spaced-apart apertures may be provided and attached to the supporting elements 32 as by screw fasteners, as shown especially in Fig. 1. The flexible conductors 41 and 42 extend from the fasteners 38b and 38c downwardly through the adjacent apertures in the positioning elements, are looped beneath the latter elements, and extend upwardly through the other apertures therein, the conductors terminating desirably at apertured mounting members 47, 47 attached to the base member 21 as by screw fasteners. The flexible conductor 41 extends through an aperture in the mounting member 47 to a terminal screw 51. However, the flexible conductor 42 extends through the aperture in the other mounting member 47 and is secured to a strip element 52 of suitable conductive material as by a screw fastener, which strip element 52 extends along a channel in the base member 21 to a second terminal screw 53. Suitable lead-in connectors 48 may be attached to the terminal screws 51 and 53 and extend through suitable sealed apertures in the wall of the casing 10.

Coil springs 55, 55 of relatively short extent as compared to that of the reaches of the flexible conductors 41 and 42 may be disposed adjacent such conductors and seated within the apertures of the positioning elements 43, 43 and of the mounting members 47, 47 in a manner to maintain such reaches in a generally parallel and spaced relation overlying the rocking platform in a condition to accommodate the rocking movement of the latter and to promote flexing in such reaches. The springs 55, 55 may also further relieve the conductors of flexing strains adjacent the positioning elements and the mounting members. It is to be understood that the springs 55, 55 may extend continuously along and adjacent the reaches of the flexible conductors and that other means such, for example, as flat strip springs or other resilient means may be provided for so maintaining and positioning the reaches of the flexible conductors.

The oscillating or rocking movement of the oscillating structure 26 about the axis of oscillation through a small degree of angular movement, as shown especially in Figs. 1 to 3, may be accomplished by a lever 56 at one end of the plate element, preferably integral therewith, the lever including a rotatable projecting journal 57 at its end opposite the plate element for rolling engagement with a bifurcated element 58 mounted on a rotatable shaft structure 59 for pivotal movement relative to such structure. A coil spring 60 mounted on the shaft 59 and having its respective ends engaging the bottom wall of the casing 10 and a projection on the shaft cooperates with an adjusting structure 61 on the shaft structure 59 to maintain the rocking platform 26 in the "off" or circuit breaking position. End portions of the shaft 59 may extend through apertures in the side walls of the casing, one end portion being retained by a collar fastener 64 and a washer 65, while a suitable foot-pedal or operating lever 62 may be mounted on the other end portion for rotating the shaft 59.

For making and breaking the electric circuit, the cylindrical closed container 31 includes therein electrically conductive flowable material such, for example, as mercury and includes spaced-apart contactor elements or end portions 68 and 69 of electrically conductive material interconnected by a joining portion 70 of electrical insulating material. The closed container 31 is disposed in the aperture of the plate element 30 such that the insulating joining portion 70 is at the element 30 while the end portions 68 and 69 are seated in the grooves of and supported by the insulating supporting elements 32, 32. The end portions 39, 39 of the conductor elements 36, 36 contact electrically and press against the end portions 68 and 69 thereby holding the closed container on the rocking platform while facilitating quick removal of such container for servicing the electric switch. The spring pressing action of the conductor elements on the container prevents effectively arcing at such end portions 68 and 69.

In the operation of the electric switch the foot-pedal 62 is depressed from its "off" position rotating the shaft structure 59 which in turn pivotally moves the bifurcated element 58 downwardly toward the bottom wall of the casing 10. This movement of the bifurcated element 58 causes the rocking platform 26 to pivot or rock on its trunnions 25, 25, due to the rolling engagement of the element 58 with the projecting journal 57 of the lever 56 on such platform. The rocking or oscillating of the platform 26, when the foot-pedal 62 is depressed, inclines the closed container 31 such that the mercury therein flows from the end portion 68 across the joining portion 70 to the end portion 69 thereby completing the circuit through the container 31. Current may then flow, for example, from the connection at the terminal screw 53 through the strip element 52 and the flexible conductor 42 to the conductor element 36 and to and through the closed container 31. The current then flows from the container 31 through the other conductor element 36 to and through the flexible conductor 41 to the other terminal screw 51. When the foot-pedal is released, it returns to its starting or "off" position under the action of the spring 60, and the platform pivots in the reverse direction oscillating the container 31 such that the mercury flows to the end portion 68 and is no longer in contact with the other end portion 69 thereby breaking the circuit through such container. The arrangement is such that only slight changes in the position of the foot-pedal are required for oscillating the rocking platform sufficiently to make-and-break the circuit through the container which facilitates rapidity of operation without exposed arcing hence eliminating any fire hazard in the presence of inflammable materials.

During the oscillating movement of the oscillating structure 26 the flexible conductors 41 and 42 are maintained by the coil springs 55, 55 in a condition to accommodate such movement while such conductors flex continuously and substantially uniformly along their reaches between the structure and the base member by virtue of their freely swung condition thereby promoting long and substantially service-free life of the electric switch.

Variations may be made without departing from the scope of the invention as it is defined in the following claims.

I claim:

1. A switch comprising a housing, a base member including spaced-apart pedestals having apertures mounted within said housing, an oscillating structure comprising a plate element of metal material having trunnions at the ends and an aperture intermediate said ends, said trunnions being disposed in the apertures of said pedestals for supporting said structure, spaced-apart supporting elements of insulating material at opposite sides of and carried by said plate element and a lever at one end of said plate element for oscillating said structure, said lever including a rotatable projecting journal at its end opposite said plate element, a closed container extending through the aperture in said plate element and supported by said supporting elements, said container comprising electrically conductive flowable material and contactor portions at said supporting elements adapted to be contacted by said flowable material when said structure is oscillated, conductor elements mounted on said supporting elements and resiliently engaging said contactor portions and holding said container, means connecting said conductor elements to an electric circuit, and means for oscillating said structure for making and breaking the circuit through said container, the oscillating means including a pivotally mounted bifurcated element engaging said projecting journal and spring means for maintaining said structure in the circuit breaking position, the connecting means comprising spaced-apart flexible conductors mounted on said base member and on said structure at said supporting elements with generally parallel open-looped reaches of the flexible conductors in upstanding positions therebetween and sleeves of helically-wound spring wire surrounding the flexible conductors at and secured to said base member and said supporting elements and extending along said conductors with the adjacent ends of the sleeves disposed beyond the base member and the structure for maintaining the reaches in said upstanding positions.

2. A switch for making and breaking an electric circuit through a closed container having electrically conductive flowable material therein, said switch comprising an oscillating structure for supporting and imparting oscillating movement to said container, said structure comprising a plate element of stiff material having an aperture intermediate its ends for receiving said container and trunnions at said ends, spaced-apart supporting elements of insulating material at opposite sides of and carried by said plate element for supporting said container, conductor means mounted on said supporting elements for electrically engaging and detachably holding said container on said structure, and means for oscillating said structure.

3. A switch for making and breaking an electric circuit through a closed container having electrically conductive flowable material therein, said switch comprising an oscillating structure for supporting and imparting oscillating movement to said container, said structure comprising a metal plate element having supporting trunnions at its ends and having an aperture intermediate said ends for receiving said container, bearings for said trunnions, spaced-apart supporting elements of insulating material secured to said plate element at opposite sides thereof and having grooves in register with said aperture for embracing said container, spring conductor elements mounted on said supporting elements and extending across said grooves for electrically engaging and resiliently holding said container, and a lever secured to said plate element at one of said ends for oscillating said structure.

4. A switch for making and breaking an electric circuit through a closed container having electrically conductive flowable material therein, said switch comprising an oscillating structure for supporting and imparting oscillating movement to said container, said structure comprising a plate element of stiff material having an aperture intermediate its ends for receiving said container and trunnions at said ends, spaced-apart supporting elements of insulating material at opposite sides of and carried by said plate element for supporting said container, conductor means mounted on said supporting elements for electrically engaging and detachably holding said container on said structure, means for connecting said conductor means to the electric circuit and comprising a single open-looped reach of flexible conductor extending from said oscillating structure in upstanding position over said structure and resilient means for maintaining said reach connected to said structure in the upstanding position clear of adjacent structure while accommodating the oscillating movement of said oscillating structure, and means for oscillating said structure.

5. A switch for making and breaking an electric circuit through a closed container having electrically conductive flowable material therein, said switch comprising an oscillating structure for supporting and imparting oscillating movement to said container, said structure comprising a metal plate element having supporting trunnions at its ends and having an aperture intermediate said ends for receiving said container, bearings for said trunnions, spaced-apart supporting elements of insulating material secured to said plate element at opposite sides thereof and having grooves in register with said aperture for embracing said container, spring conductor elements mounted on said supporting elements and extending across said grooves for electrically engaging and resiliently holding said container, a lever secured to said plate element at one of said ends for oscillating said structure, and means for connecting said conductor element to an electrical circuit, the connecting means comprising a single open-looped reach of flexible conductor extending from said oscillating structure in upstanding position over and clear of said structure and a flexible sleeve of spring wire closely coiled about said flexible conductor at said structure and terminating beyond the latter for so maintaining said flexible conductor in said position while accommodating the oscillating movement of said structure.

6. A safety switch for extensive operation and relatively rapid frequency of making and breaking an electric circuit through a closed container having electrically conductive flowable material therein, said switch comprising an oscillating structure including a single integral rocking platform of stiff material having a length along the axis of oscillation at least equal to the width thereof and mounting means at the ends of the platform extending outwardly therefrom along said axis for permitting oscillating movement of said structure, said platform having an opening therein intermediate said ends extending across said axis from side to side of the structure for receiving said container, the wall of said opening being continuously annular for supporting said container and circumferentially embracing entirely about the latter, conductor means for connecting said container to an electric circuit and comprising a single open-looped reach of flexible conductor extending from said platform in upstanding position over said platform from one side of said axis to the other side thereof and means for maintaining said reach connected to said structure in the upstanding position with relation to said platform and the aforesaid relation to said axis clear of adjacent structure while accommodating oscillating movement of said oscillating structure and promoting continuity of substantially uniform flexing along said reach of said flexible conductor during said movement, and means for oscillating said platform about said axis through a small degree of angular movement for making and breaking the circuit through the container.

7. A safety switch for extensive operation and relatively rapid frequency of making and breaking an electric circuit through a closed container having electrically conductive flowable material therein, said switch comprising an oscillating structure comprising a single integral and elongated rocking member of stiff material disposed at and extending lengthwise along the axis of oscillation of said structure, said member having a trunnion of said material integrally united with the material of said member at each end of the latter and extending outwardly therefrom along said axis of oscillation and said member having an opening therethrough intermediate the ends and extending from side to side of said member across said axis of oscillation for receiving said container therein, means for detachably mounting and holding said container on said structure and in said opening of the rocking member, means for connecting said container to an electric circuit while accommodating the oscillating movement of said structure, and means for oscillating said structure about said axis through a small degree of angular movement for making and breaking the circuit through the container.

8. A safety switch for extensive operation and relatively rapid frequency of making and breaking an electric circuit through a closed container having electrically conductive flowable material therein, said switch comprising an oscillating structure comprising an elongated rocking member of stiff plate material disposed at and extending lengthwise along the axis of oscillation of said structure, said member having a trunnion of stiff material integrally united with said material of the member at each end of the latter and opposite spaced-apart relatively flat and broad sides and having a bore therethrough intermediate the ends and extending between said sides across said axis for receiving and circumferentially enclosing said container, spaced-apart supporting elements of insulating material extending along said member and carried by said member at said opposite sides, conductor elements of resilient material mounted on and extending along said supporting elements and constructed and arranged to resiliently maintain said container in said bore in a freely detachable manner and to electrically engage said container, means for connecting said conductor elements to an electrical circuit while accommodating oscillating movement of said structure, and means for oscillating said structure about said axis through a small degree of angular movement for making and breaking the circuit through the container.

9. An oscillating structure for a safety switch adapted for frequently making and breaking an electric circuit through a closed container having electrically conductive liquid material therein, said structure comprising an elongated rocking member of stiff plate material for disposition at and lengthwise along the axis of oscillation, said member having trunnions of stiff material integrally united therewith and extending outwardly from the ends of said member at and along said axis and said member having a bore therethrough intermediate said ends and extending between opposite sides of said member in the direction across said axis for receiving said container therein, spaced-apart supporting elements of insulating material at said sides and carried by said member, and means including conductor means for holding said container in a freely detachable manner on said structure in said bore and for connecting said container to an electric circuit.

10. An oscillating structure for a safety switch adapted for frequently making and breaking an electric circuit through an elongated closed container having electrically conductive liquid material therein and contactor elements at its ends, said structure comprising an elongated rocking member of stiff metal plate material for disposition at and lengthwise along the axis of oscillation, said member having trunnions of said material integrally united therewith and extending outwardly from the ends of said member at and along said axis and said member having a bore therethrough intermediate the depth thereof and said ends and extending between opposite sides of said member in the direction across said axis for receiving said container therein, the wall of said bore extending entirely about the circumferential extent of said container, spaced-apart supporting elements of insulating material at and extending along said sides and carried by said member, said elements having openings therethrough in register with said bore providing walls of said insulating material for supporting said container at said contactor elements, and means including conductor elements of resilient metal material mounted on and extending along said supporting elements for electrically engaging said contactor elements and connecting said container to an electric circuit, said conductor elements being constructed and arranged to hold said container in a freely detachable manner in said bore of said member and said openings in said supporting elements.

11. A switch comprising a base member, a platform mounted on said base member for rocking movement about an axis, means on said platform for making and breaking an electric circuit under the rocking movement, a pair of flexible conductors axially spaced-apart and mounted on said base member at opposite sides of said axis, each conductor extending in a loop across the platform to a position thereon at the opposite side of said axis in crossed relation with the other loop so that the influence of one of said conductors in affecting the rocking movement of said platform tends to counteract the influence of the other conductor under the rocking movement, and means for rocking said platform for making and breaking the circuit through the first said means.

12. A switch comprising a base, an elongated platform mounted on said base member for rocking movement about an axis and extending lengthwise along said axis, contact means including conductor elements on said platform spaced-apart transversely of said axis for making and breaking an electric circuit under the rocking movement, a pair of flexible conductors mounted on said base member at opposite sides of said axis, each conductor extending in a loop in upstanding position with relation to said platform to a position on the latter at the opposite side of said axis in crossed relation with the other loop so that the influence of one of said conductors in affecting the rocking movement of said platform tends to counteract the influence of the other conductor under the rocking movement, and means for rocking said platform for making and breaking the circuit through said contact means.

*13. A safety switch for extensive operation and relatively rapid frequency of making and breaking an electric circuit through a closed container having electrically conductive flowable material therein, said switch comprising an oscillating structure comprising a single integral and elongated rocking member of stiff material disposed at and extending lengthwise along the axis of oscillation of said structure, said member having a trunnion of said material integrally united with the material of said member at each end of the latter and extending outwardly therefrom along said axis of oscillation and said member having an opening therethrough intermediate the ends and extending from side to side of said member across said axis of oscillation for receiving said container therein, means for detachably mounting and holding said container on said structure and in said opening of the rocking member in a disposition across said axis, said means including a supporting element of insulating material on said rocking member at said opening thereof providing with such member a seat to support said container with said axis intersecting said container at an intermediate region thereof so that by virtue of such intersection quick tilting of said container under oscillation of said structure about said axis is effected without movement in translation of said container as a whole, means for connecting said container to an electric circuit while accommodating the oscillating movement of said structure, and means for oscillating said structure about said axis through a small degree of angular movement for making and breaking the circuit through the container.*

*14. A switch comprising a base member, a platform mounted on said base member for rocking movement about an axis, means including a closed container having electrically conductive flowable material therein on said platform for making and breaking an electric circuit through said container under the rocking movement, said container having a disposition on said platform in the direction across said axis such that said axis intersects said container at an intermediate region thereof so that by virtue of such intersection quick tilting of said container under the rocking movement about said axis is effected without movement in translation of said container as a whole, a pair of flexible conductors in electrically connected relation to said container disposed axially spaced-apart and mounted on said base member at a side of said axis, each conductor extending in a loop across the platform to a position thereon at the region of said axis, and means for rocking said platform for making and breaking the circuit through said container.*

*15. A switch comprising a base, an elongated platform mounted on said base for rocking movement about an axis and extending lengthwise along said axis to provide a seat disposed transversely of said axis and between the ends of said platform for supporting a closed container having electrically conductive flowable material therein on said seat with said axis intersecting said container at an intermediate region thereof so that by virtue of such intersection quick tilting of said container under the rocking movement about said axis is effected without movement in translation of said container as a whole, contact means including conductor elements on said platform spaced-apart transversely of said axis for electrical connection to said container for making and breaking an electric circuit through said container under the rocking movement, and a pair of flexible conductors each mounted on said base at a side of said axis and each extending in a loop in upstanding position with relation to said platform to a position on said platform at the region of said axis, and means for rocking said platform for making and breaking the circuit through said contact means and the closed container.*

ANTHONY G. SEIFRIED.

REFERENCES CITED

The following references are of record in the file of this patent or the original patent:

UNITED STATES PATENTS

| Number | Name | Date |
|---|---|---|
| 1,701,398 | Vickery | Feb. 5, 1929 |
| 1,739,293 | Deems | Dec. 10, 1929 |
| 1,831,936 | Walker | Nov. 17, 1931 |
| 1,837,248 | Aalborg | Dec. 22, 1931 |
| 1,852,539 | Ross | Apr. 5, 1932 |
| 1,906,118 | Staley | Apr. 25, 1933 |
| 1,957,814 | Anderson | May 8, 1934 |